Aug. 2, 1966  M. J. LUGASH  3,263,835
LOADING APPARATUS FOR VEHICLES
Filed May 27, 1964  3 Sheets-Sheet 1

INVENTOR.
MAX J. LUGASH
BY
ATTORNEY

Aug. 2, 1966    M. J. LUGASH    3,263,835

LOADING APPARATUS FOR VEHICLES

Filed May 27, 1964    3 Sheets-Sheet 3

INVENTOR.
MAX J. LUGASH
BY
ATTORNEY 3,263,835
LOADING APPARATUS FOR VEHICLES
Max J. Lugash, Los Angeles, Calif., assignor to Maxon Industries, Inc., Vernon, Calif., a corporation of California
Filed May 27, 1964, Ser. No. 370,422
9 Claims. (Cl. 214—77)

This invention relates to loading apparatus for vehicles and particularly to a loading attachment or adjunct for vehicles and semi-trailers which are loaded from the sides or rear.

In my patents, No. 2,837,227 and No. 2,989,196, I show such loading hoists for trucks. These hoists have invertable platforms that may be folded under the vehicle when not in use and unfolded and lowered to the ground when in operation. The present invention is of the same general type in that it is readily attachable to the vehicles but may be rotated under the vehicle when not in use and rotated from under the vehicle and raised or lowered for loading operations. Operation of the apparatus is particularly simple and it may be easily attached to the frame of the vehicle without alteration of the vehicle and in such a way that it may be easily rotated to and locked in its travelling position and rotated again to its operational position.

The principal object of the invention, therefore, is to facilitate the loading of vehicles such as trucks and semi-trailers from the sides or rear thereof.

Another object of the invention is to provide improved side loading apparatus for so called "frameless" vehicles.

A still further object of the invention is to provide an improved hydraulic hoist apparatus which may be rapidly positioned in its travelling location under the vehicle and rapidly rotated 90 degrees to its operational position, the apparatus being particularly advantageous for use as a side loader.

A better understanding of this invention may be had from the following detailed description when read in conjunction with the accompanying drawings, in which.

Figure 1:
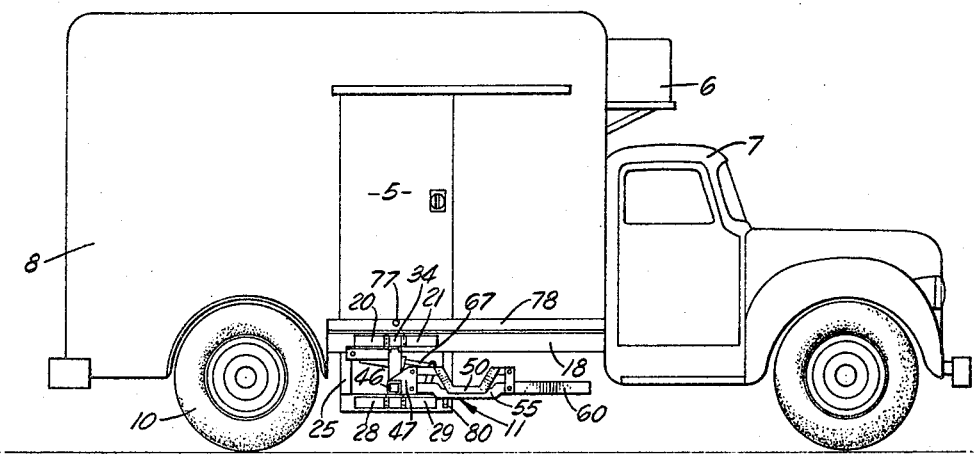
FIG. 1 is a side elevational view of the invention installed on one type of side loading vehicle.
Figure 3:
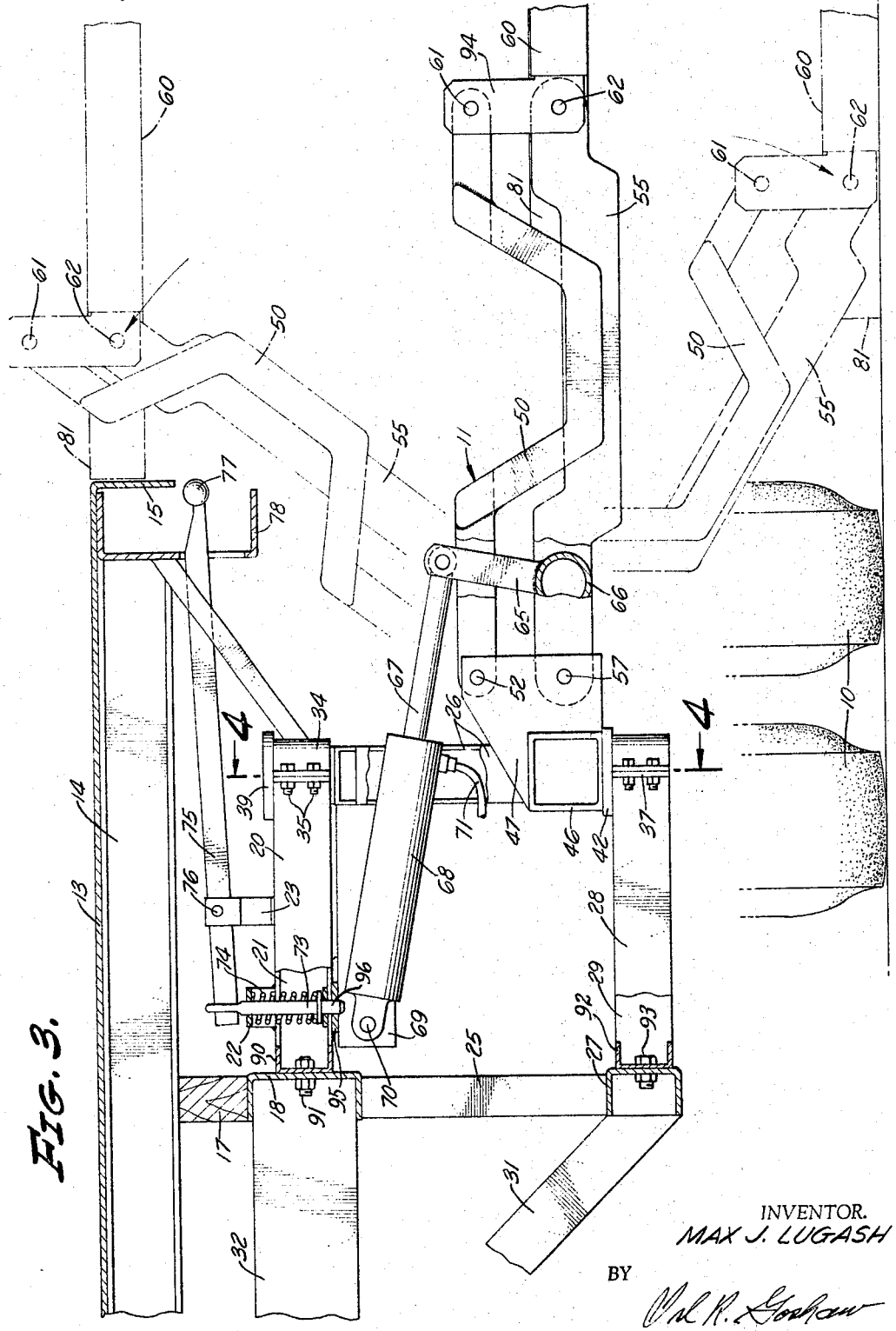
FIG. 3 is a vertical section of the invention showing three positions of the loading platform.
Figure 4:
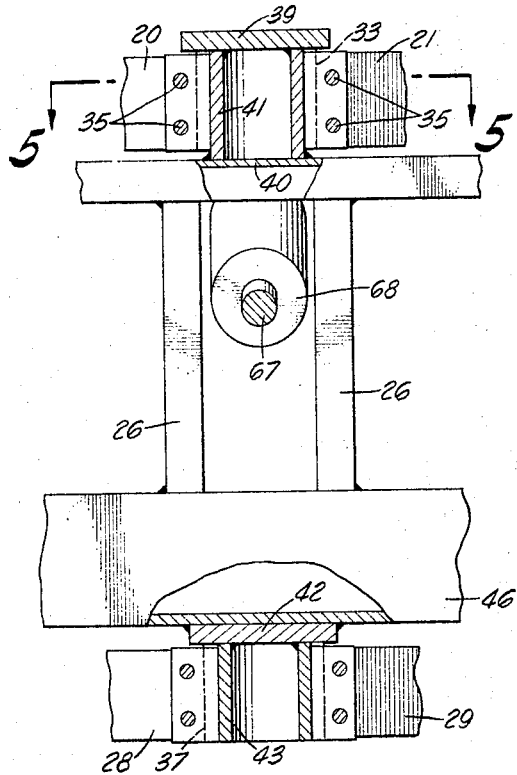
FIG. 4 is a vertical section taken along the line 4—4 of FIG. 3.

Referring, now, to the drawings in which the same numerals identify the same elements, FIG. 1 shows a type of truck used for transporting milk or other goods requiring refrigeration, the truck having a sliding side door 5, a cooler 6, a cab 7, and a body 8. Suspended under the central portion of the truck and just ahead of the rear wheels 10 is the loading apparatus of the invention, shown generally at 11. The chassis frame for the truck is conventional and includes side frame members 18 rigidly interconnected by transversely extending cross frame members 32. On top of the chassis frame are affixed sills 17, over the side frame members 18, to support floor frame members 14 disposed transversely of the chassis and covered by a floor covering member 13. The floor members 14 are bounded by side rails 78 and the floor 13 may be provided with an integral flange 15 overhanging the side rails, as shown in FIGURE 3.

In general, the lifting device comprises a rigid base framework that is stationarily affixed to the truck chassis and which in turn pivotally supports another framework on which a load supporting platform, lifting arms and power means are carried. The stationary framework includes an upper horizontally disposed A-frame including angularly related legs 20 and 21, rigidly interconnected by cross members 22 and 23. At their spaced extremities, the legs 20 and 21 are interconnected by a channel-shaped member 90 that is secured to the chassis side frame member 18 by suitable fasteners 91. The stationary frame also includes a lower horizontally disposed A-frame including angularly related legs 28 and 29 whose spaced ends are rigidly interconnected to another channel-shaped member 92. A spaced pair of vertically extending members 25 rigidly interconnect the chassis side frame member 18 and a relatively heavy horizontally disposed channel 27 to which the lower A-frame is connected by appropriate fastening means 93. A pair of braces 31 extend from opposite ends of the channel 27 for rigid interconnection to the underside of the chassis frame (at points not shown) whereby to stabilize the loader when in use.

Figure 5:
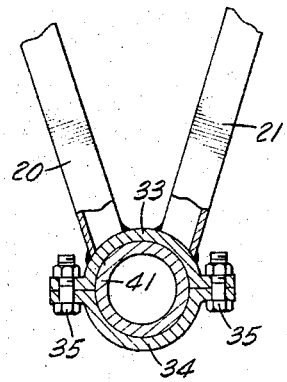
FIG. 5 is a horizontal section taken along the line 5—5 of FIG. 4.
Figure 7:
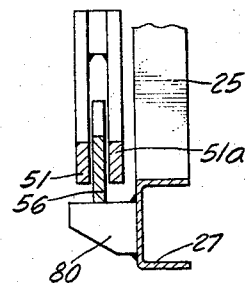
FIG. 7 is a detailed view taken along the line 7—7 of FIG. 1.
Figure 6:
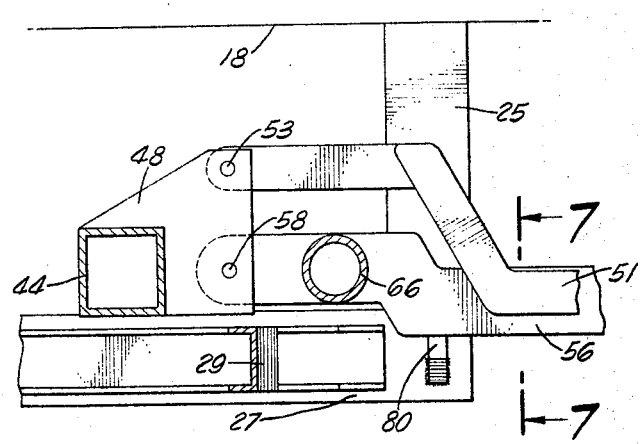
FIG. 6 is an enlarged fragmentary view of a portion of the invention shown in FIG. 1.

In order to support the swingable framework of the device, both A-frames are provided at their apices with vertically bearing means. As is shown in FIGURE 5, the legs 20 and 21 of the upper A-frame terminate in and are joined to a half section 33 of a bearing, whose other half section 34 is secured thereto by means of appropriate nut and bolt fasteners 35. Although not illustrated in detail, it will be understood that the lower A-frame has a bearing 37 of the same construction and in vertical alignment with the plain bearing in the upper A-frame.

The swingable frame of the device includes a lower horizontally disposed main frame member 46, here illustrated as in the form of a box beam. On top of the member 46 are secured a spaced pair of vertically extending members 26, spaced on opposite sides of the midpoint of the main frame member, and having their upper ends rigidly secured to a cross member 40. A cylindrical bearing 41 is affixed on top of the member 40 to be received within the bearing at the apex of the upper A-frame and is surmounted by a cap member 39 rigidly secured thereto and acting as a thrust bearing on top of the upper A-frame. In somewhat similar fashion, the main frame member 46 has a plate 42 welded to its underside and carrying a cylindrical bearing 43 that is seated within the bearing at the apex of the lower A-frame.

In order to mount the loading platform and its lifting means on the swingable frame, the main frame member 46, at opposite ends, is provided with ears 47 and 48, welded thereto. These ears serve as pivot supports for the inner ends of two pairs of lifting arms. One pair of lifting arms is shown in FIGURE 3, comprising a lower arm 55 and an upper arm 50, which acts as a lazy bar, the primary load being taken by the lower arm 55. The arms 50 and 55 are pivotally connected to the ears 47 at vertically spaced apart points by pins 52 and 57, respectively. At their swingable ends, the arms 50 and 55 are pivotally connected at 61 and 62, respectively to a vertical link 94 that, in turn, is rigidly connected to a load carrying platform 60. In similar fashion, the other pairs of lifting arms 51 and 56 have pivotal connections at 53 and 58, respectively, to the other ear 48 and at their swingable ends to another link 94 that is also rigidly connected to the platform 60. It will be observed that the pivots 52, 57, 61 and 62, for example in FIGURE 3, define a parallelogram linkage system, whereby the load platform 60 is maintained in substantially horizontal attitude throughout its movement from ground level up to the bed of the truck.

In order to raise and lower the platform, the hydraulic power means is also mounted on the swingable frame. Thus, a pair of heavy bracket arms 69 are secured rigidly to the rear face of the member 40, to be interconnected at their free ends by a pivot pin 70 to which one end of a hydraulic cylinder 68 is secured. A piston rod 67 extends out of the other end of the cylinder 68 to be pivotally connected to the free end of a crankarm 65 having its other end rigidly secured to a cross member 66 that extends between and is rigidly secured to the lower lifting arms 55 and 56. The actuating fluid is conducted to and from the interior of the cylinder 68 by appropriate conduit means 71 in order to reciprocate the piston (not shown) within the cylinder.

Figure 2:
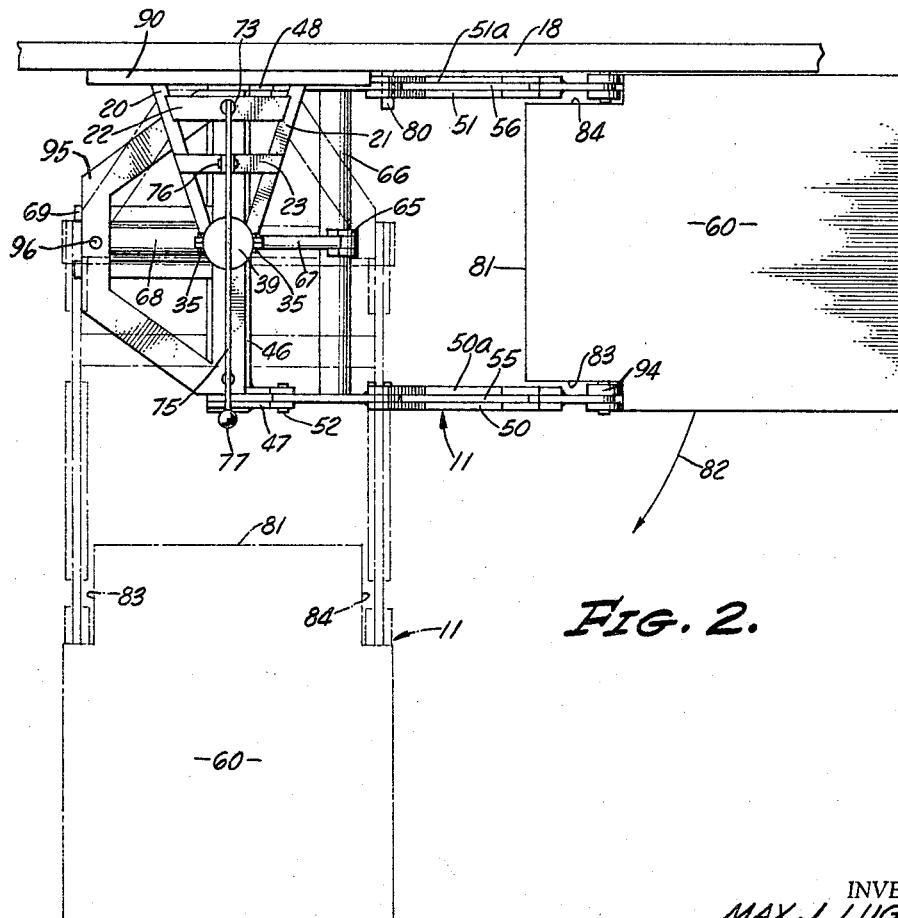
FIG. 2 is a plan view of the lifting platform in its travelling position, the operational position of the apparatus being shown in phantom lines.

The position of platform 60 shown in FIG. 1 and its solid line position shown in FIG. 2 is the travelling position of the platform. It is held in this position by a pin 73 passing through plate 22 into a generally D-shaped plate 95 secured on top of the member 40 and members 69 to which cylinder 68 is attached. The pin is biased in locking position by a spring 74 and released by a manually operable arm 75 in a slot of pin 73 and pivoted at 76 on plate 23. When the pin is released by hand knob 77, the cylinder and mounting standard and plates can be rotated 90 degrees to position the platform outwardly from the side of the truck as shown in phantom lines in FIG. 2. The device is locked in operative position by entry of pin 73 into a hole 96 at the center of plate 95. When the platform is loaded and raised, its top surface is in the same plane as the surface of the truck bed since the end of the platform abuts the flange 15 of the floor 13 (see FIG. 3). The arms 50 have their central portions depressed to accommodate beam 78 of the vehicle, the beam, therefore, not interfering with the raising of the platform to its required level as shown in FIG. 3. It will be noted that the platform 60 has a considerable portion 81 between the pivot points of the arms 50, 50a, 51, 51a, 55, and 56 and the flange 15. This permits more equalization for top-heavy loads, since a portion of the load will be on portion 81 of the platform 60. Furthermore, this pantograph construction avoids the use of a removable plate to span any gap between the truck and platform.

To hold the loader in travelling position with respect to elevation, a stop 80 is welded to cross plate 27 so that the lower surface of arm 56 will rest on it when the pressure in cylinder 68 is released. To position the loader in operational position, the pressure in cylinder 68 is increased to slightly raise the platform 60 and then swing it out 90 degrees after it is released from pin 73 as shown by arrow 82 in FIG. 2.

It will be noted that the platform 60 has notches 83 and 84 to obtain its full width and also to adjust to variations in the position of flange 15 of the vehicle. This type of side loading apparatus requires no alternation to the vehicle body structure. It is particularly suitable for refrigerated vehicles inasmuch as the door of the vehicle may be closed during the loading and unloading of the platform 60, thus maintaining the refrigeration. Furthermore, a particularly large platform 60 may be hinged at any point in cases where refrigeration units or other equipment are located under the vehicle. Although a sliding door 5 is shown, the loader will also function with swinging doors.

While the presently preferred embodiment of the invention has been chosen for the purposes of illustration and description herein, it will be appreciated that various changes in design, structure and arrangement may be made without departing from the spirit and scope of the appended claims.

I claim:

1. Loading apparatus for vehicles comprising a frame suspended under and in the central area of a vehicle, means on said frame for rotating a portion thereof approximately 90 degrees from a position under said vehicle to a position extending from said vehicle, said portion including a platform and pantograph arms pivoted adjacent one end of said platform, means for raising said platform to the level of the floor of said vehicle and for lowering said platform to the ground and means for locking said portion when under said vehicle and holding said platform in a partially raised position under said vehicle, said locking means including a pin adapted to pass through a member of said frame and a member of said rotating portion, a spring being provided for holding said pin in locking position together with a lever for raising said pin from said member of said rotating portion.

2. Loading apparatus for loading a vehicle through the side doors thereof comprising a frame suspended under said vehicle near a side door thereof, bearings on said frame, pantograph sets of arms, a platform on said arms, said arms and platform being adapted to rotate approximately 90 degrees on said bearings to extend said platform at substantially a right angle from the side of said vehicle and under said door, means for raising said platform to the floor of said vehicle at said door and for lowering said platform to the ground and means for locking said arms and platform in a partially raised position under said vehicle together with means for holding said platform and said arms in a partially raised position.

3. Loading apparatus in accordance with claim 2 in which manual means are provided for releasing said locking means.

4. Loading apparatus for vehicles comprising a frame, means for suspending said frame from and under said vehicle, a platform, pantograph arms pivotally connected to said platform and to said frame, pivot means on said frame for rotating said platform and said arms substantially 90 degrees in horizontal planes, one pivot position being under said vehicle and the other pivot position extending said platform and arms away from under said vehicle.

5. Loading apparatus in accordance with claim 4 in which said platform and arms have two extreme vertical positions, means being provided for locking said arms and platform at an intermediate position under said vehicle.

6. In loading apparatus for vehicles that is movable between an operative position extending beyond the vehicle and a stored position beneath the vehicle, the combination comprising:
 a platform;
 a frame;
 two pairs of arms, said pairs being laterally spaced apart, the arms of each pair extending between said platform and said frame and being pivotally connected to said platform and frame;
 the pivotal connections of said pairs of arms to said platform and frame being adapted and arranged to maintain said platform in substantially horizontal planes during raising and lowering thereof as said arms are raised and lowered;
 and means for interconnecting said frame to the underside of a vehicle for horizontally swinging said platform, frame and arms between said stored and operative positions.

7. In loading apparatus for vehicles having a platform, a frame and two pairs of spaced arms pivotally interconnected at opposite ends of said pairs of arms to said platform and to said frame, the improvement comprising means for interconnecting said frame to the underside of a vehicle for horizontally swinging said platform, frame and arms into and out of a stored position beneath said vehicle.

8. In a loading apparatus for vehicles that is movable between an operative position extending beyond the vehicle and a stored position beneath the vehicle, the combination comprising:
 a platform;

a frame;

two pairs of arms, said pairs being laterally spaced apart, the arms of each pair extending between said platform and said frame and being pivotally connected to said platform and to said frame, the pivotal connection of said pairs of arms to said platform and frame being adapted and arranged to maintain said platform in substantially horizontal planes during raising and lowering thereof as said arms are raised and lowered;

the pivotal connection between said arms and platform being spaced rearwardly from the forward edge of said platform to dispose a portion of said platform forwardly of said last mentioned pivotal connections;

said portion of said platform being of a size to fully occupy the span between an edge of said vehicle and said last mentioned pivotal connections, whereby to eliminate any substantial gap therebetween when said platform is raised to the same level as the floor of said vehicle, and means for interconnecting said frame to the underside of a vehicle for horizontally swinging said platform, frame and arms between stored and operative positions.

9. A loading apparatus as set forth in claim 8, in which said last mentioned pivotal connections comprise a pair of vertical links having vertically spaced apart points of pivotal connections to said lifting arms, said vertical links being rigidly interconnected to at least said portion of said platform disposed forwardly of said last mentioned pivotal connections, said platform being disposed substantially at the level of the lower of said pivotal connections.

References Cited by the Examiner

UNITED STATES PATENTS

| | | | |
|---|---|---|---|
| 758,493 | 4/1904 | Abbey | 214—75 |
| 2,527,818 | 10/1950 | Ives | 214—77 |
| 2,889,059 | 6/1959 | Selzer | 214—77 |
| 2,989,196 | 6/1961 | Lugash | 214—75 |

GERALD M. FORLENZA, *Primary Examiner.*

R. G. SHERIDAN, *Assistant Examiner.*